US012031356B2

(12) United States Patent
Neudinger

(10) Patent No.: US 12,031,356 B2
(45) Date of Patent: Jul. 9, 2024

(54) DEVICE FOR CENTRALLY ARRANGING LOCKS AND A GAMING MACHINE COMPRISING SUCH A DEVICE

(71) Applicant: NOVOMATIC AG, Gumpoldskirchen (AT)

(72) Inventor: Philipp Neudinger, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 699 days.

(21) Appl. No.: 17/097,287

(22) Filed: Nov. 13, 2020

(65) Prior Publication Data

US 2022/0154493 A1 May 19, 2022

(51) Int. Cl.
*E05B 47/02* (2006.01)
*E05B 47/00* (2006.01)
*E05B 53/00* (2006.01)
*G07C 9/00* (2020.01)

(52) U.S. Cl.
CPC ............ *E05B 47/02* (2013.01); *E05B 53/005* (2013.01); *G07C 9/00182* (2013.01); *G07C 9/00896* (2013.01); *E05B 2047/0014* (2013.01); *E05B 2047/0094* (2013.01)

(58) Field of Classification Search
CPC .. E05B 53/003; E05B 53/005; E05B 63/0065; E05B 63/22; E05B 63/14; E05B 65/466
See application file for complete search history.

(56) References Cited

U.S. PATENT DOCUMENTS 5,113,990 A * 5/1992 Gabrius .................. G07F 17/32 463/25
2002/0041133 A1 4/2002 Hedrick et al.
2008/0113818 A1 5/2008 Beadell et al.
2010/0117384 A1* 5/2010 Cole ......................... E05C 9/02 292/341.15
2016/0005266 A1* 1/2016 Kawashima ........ E05B 65/0003 463/20
2019/0003207 A1* 1/2019 Wu ....................... E05B 47/026
2019/0096173 A1 3/2019 Brandau et al.

OTHER PUBLICATIONS

Search Report issued in European Patent Appln. No. 21207979, daed Apr. 6, 2022.
Office action issued in corresponding European Patent Appln. No. 21207979.2, dated Oct. 12, 2023.

* cited by examiner

*Primary Examiner* — Christine M Mills
*Assistant Examiner* — Yahya Sidky
(74) *Attorney, Agent, or Firm* — MaxGoLaw PLLC

(57) ABSTRACT

Disclosed is a device for centrally arranging locks for doors of a gaming machine's housing. The device including remote locking units of which each remote locking unit is assigned one or more locks and includes a remote power transmission unit, a displaceable unit operatively coupled to a first end of the remote power transmission unit, and a locking member operatively coupled to a second end of the remote power transmission unit. Each lock includes a blocking member. The remote power transmission unit transmits a displacement of the displaceable unit from the first to the second position such that the locking member releases a latching mechanism of a door whereas the locking member locks the latching mechanism when the displaceable unit is in the first position.

18 Claims, 4 Drawing Sheets

DEVICE FOR CENTRALLY ARRANGING LOCKS AND A GAMING MACHINE COMPRISING SUCH A DEVICE

BACKGROUND

The present disclosure relates to a device for centrally arranging locks, and in particular to a device that adjacently arranges locks for doors of a gaming machine's housing.

Gaming machines offer a variety of games such as slot games, video poker games, roulette games, keno games, and other types of wagering games that are commonly deployed at a casino or gaming facility for use by players. Typically, a gaming machine comprises a housing for storing the components, which are necessary to operate the gaming machine. The housing usually comprises doors or flaps in order to provide access to the parts of the housing's interior. These doors or flaps are often secured by locks so that access to the components of the gaming machine is restricted to authorized personnel only. However, the locks are often difficult to access due to the arrangement of the doors or flaps, for example, in a lower part of the housing. Furthermore, each lock is placed at a different location so that a check of the state of every lock is laborious.

While gaming machines comprising prior art housings have been successful, there remains a need for improving the accessibility of the housings' locks and the ease of checking the locks' state. The present invention offers solutions to these and other problems associated with the arrangement of locks for a housing of a gaming machine.

SUMMARY

The present invention relates to a device for centrally arranging locks and a gaming machine having adjacently arranged locks for doors of the gaming machine's housing.

It is noted that, throughout the present description and claims, the term "door" is used to mean not only a door but also any kind of openable and closable structure, such as, but not limited to, a flap or a swiveling part of a casing, used to provide access to at least a part of a housing's interior. Furthermore, where the terms "comprising" and "comprises" are used, they do not exclude other elements or steps.

In an embodiment, a device for centrally arranging locks comprises a plurality of locks and a plurality of remote locking units, wherein each remote locking unit of the plurality of remote locking units is assigned one or more locks of the plurality of locks. Each remote locking unit comprises a remote power transmission unit having a first end and a second end, a displaceable unit displaceable between a first position and a second position, the displaceable unit being operatively coupled to the first end of the remote power transmission unit, and a locking member having a locking state and a releasing state, the locking member being operatively coupled to the second end of the remote power transmission unit. The remote power transmission unit transmits a displacement of the displaceable unit from the first position to the second position such that a state of the locking member changes from the locking state to the releasing state. Each lock of the one or more locks has a locked state and an unlocked state and comprises a blocking member. Each blocking member prevents the displaceable unit from leaving the first position when the respective lock is in the locked state.

In another embodiment, a gaming machine for playing a game comprises a device for centrally arranging locks and a housing with a plurality of doors. Each door of the plurality of doors comprises a latching mechanism and is assigned a remote locking unit of a plurality of remote locking units of the device for centrally arranging locks. Each latching mechanism is actuated by a locking member of the remote locking unit assigned to the respective door.

In yet another embodiment, a gaming machine for playing a game comprises a housing with a plurality of doors, a plurality of locks adjacently arranged on a section of an outer surface of the housing, and a plurality of remote locking units. Each door of the plurality of doors is exclusively assigned a remote locking unit of the plurality of remote locking units. The remote locking unit is assigned one or more locks of the plurality of locks and comprises a remote power transmission unit having a first end and a second end, a displaceable unit displaceable between a first position and a second position, the displaceable unit being operatively coupled to the first end of the remote power transmission unit, and a locking member having a locking state and a releasing state, the locking member being operatively coupled to the second end of the remote power transmission unit. The remote power transmission unit transmits a displacement of the displaceable unit from the first position to the second position such that a state of the locking member changes from the locking state to the releasing state. Each of the one or more locks has a locked state and an unlocked state and comprises a blocking member preventing the displaceable unit from leaving the first position when the respective lock is in the locked state. The displaceable unit is allowed to shift from the first position to the second position when each of the one or more locks is in the unlocked state. Each door of the plurality of doors comprises a latching mechanism, which is actuated by the locking member of the remote locking unit exclusively assigned to the respective door.

Features and advantages will become apparent from the following detailed description of the invention and its various embodiments, taken in conjunction with the accompanying figures and drawings.

BRIEF DESCRIPTION OF THE DRAWINGS

The drawings constitute a part of this specification and may include exemplary embodiments of the present disclosure and illustrate various objects and features thereof. A further understanding of the disclosure may be had by reference to the accompanying drawings in which.

DETAILED DESCRIPTION

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

Figure 1:
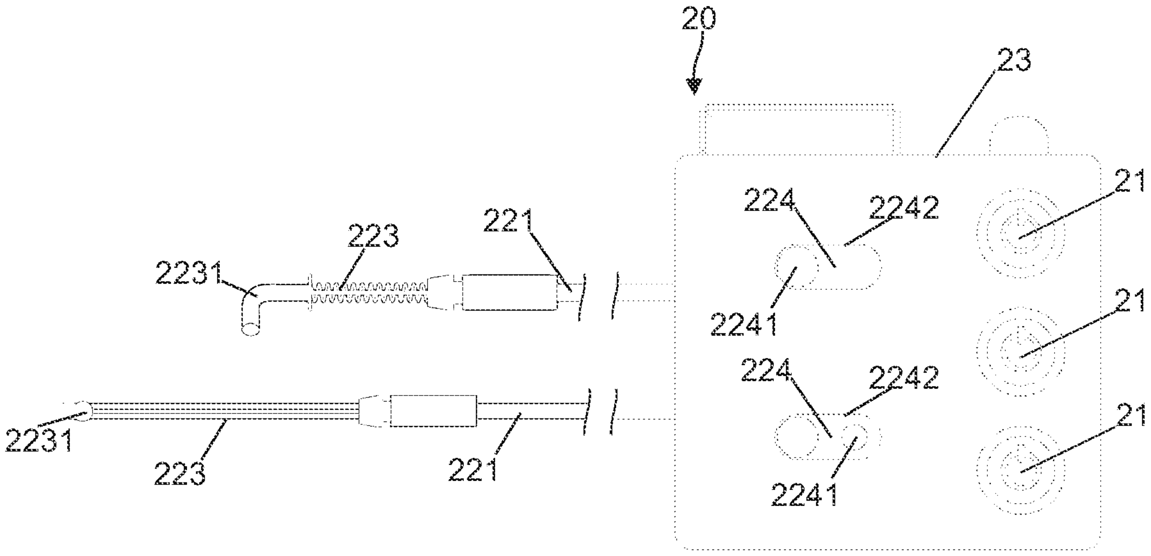
FIG. 1 is a front view of a device for centrally arranging locks in accordance with an embodiment.

FIG. 1 shows a front view of a device 20 for centrally arranging locks in accordance with an embodiment of the present invention. The device 20 comprises a casing 23 housing three locks 21 and part of an upper and a lower remote locking unit. For each of the two remote locking units, FIG. 1 depicts a slide switch 224 and a part protruding from the casing 23. The protruding parts of the remote locking units include tail sections of remote power transmission units 221 and locking members 223 operatively coupled to the remote power transmission units 221. Each locking member 223 comprises a hook 2231 for actuating, for example, a latch of a latch mechanism of a door. In the figures, the latch mechanisms are not shown. The two remote locking units and the three locks 21 are described in greater detail below.

Figure 2:
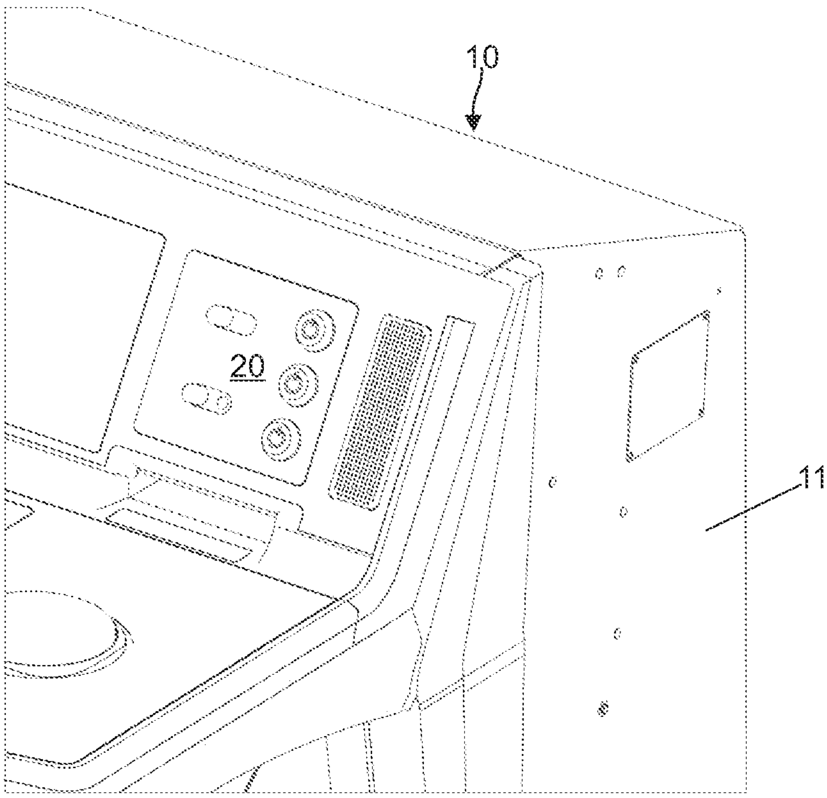
FIG. 2 is a perspective view of part of a gaming machine comprising the device of FIG. 1.

FIG. 2 is a perspective view of part of a gaming machine 10 comprising the device 20 of FIG. 1. The gaming machine 10 comprises a housing 11 in which a device 20 for centrally arranging locks is removably integrated. The device 20 allows for adjacent arrangement of locks 21 for doors of the gaming machine 10 on a section of an outer surface of the housing 11. The locks 21 are arranged one below the other. Slide switches 224 are arranged on the left of the locks 21. This arrangement facilitates checking the locking status of each door of the gaming machine 10 at a single glance. Furthermore, devices 20 for centrally arranging locks may be prefabricated, thereby simplifying the assembly of gaming machines using the devices 20.

Figure 3:
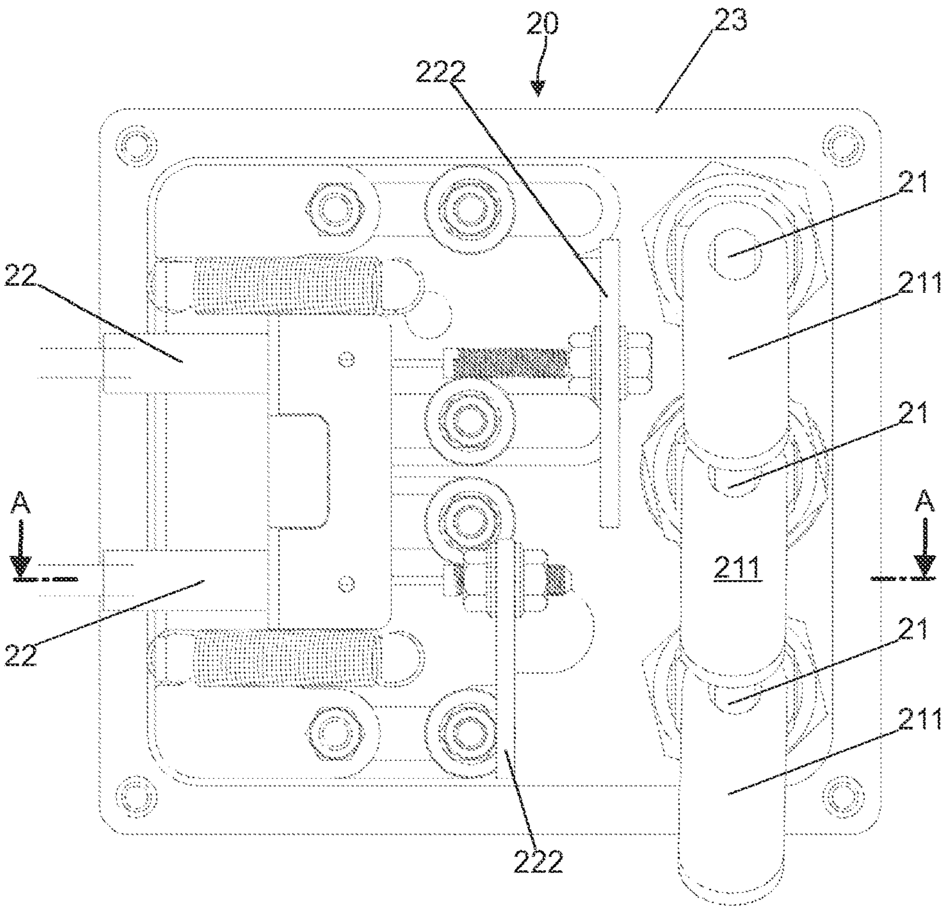
FIG. 3 is a rear view of the interior of the device of FIG. 1.
Figure 4:
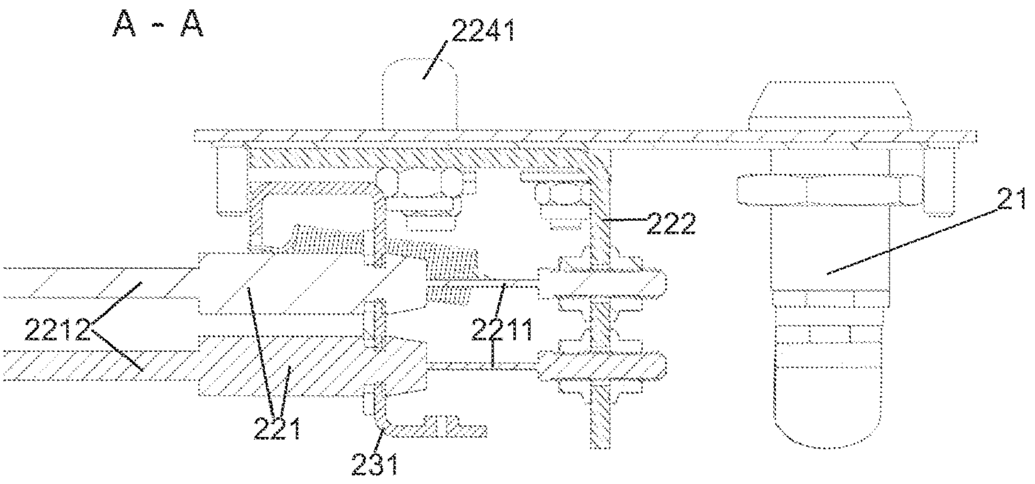
FIG. 4 is a cross-sectional view along line A-A of FIG. 3.

FIG. 3 is a rear view of the interior of the device of FIG. 1 and FIG. 4 is a cross-sectional view along line A-A of FIG. 3.

Referring to FIG. 3, the device 20 comprises three locks 21 and two remote locking units 22. The two remote locking units 22 are arranged on the left of the three locks 21 and both the three locks 21 and the two remote locking units 22 are arranged one below the other. Each remote locking unit 22 comprises a displaceable unit 222, which is displaceable between a first position and a second position. In FIG. 3, the displaceable unit 222 of the upper remote locking unit 22 is shown in the second position, whereas the displaceable unit 222 of the lower remote locking unit 22 is shown in the first position, which is to the left of the second position. Each remote locking unit 22 further comprises a slide switch 224 connected to the displaceable unit 222 of the respective remote locking unit 22. As is best seen in FIG. 1, the slide switch 224 has a pin 2241, which moves in an elongated aperture 2242 of the casing 23, when the displaceable unit 222 is shifted between the first position and the second position. Thus, the position of the pin 2241 in the elongated aperture 2242 indicates the position of the respective displaceable unit 222.

Referring to FIG. 4, a displaceable unit 222 comprises an L-shaped plate having two sidepieces. A first sidepiece runs parallel to the front side of the casing 23. The pin 2241 of the slide switch 224 is connected to the first sidepiece so that a displacement of the displaceable unit 222 between the first position and the second position is guided by the pin 2241 moving in the elongated aperture 2242. However, in alternative embodiments, the remote locking units 22 may further include linear slides mounted on the casing 23 for guiding the displaceable units 222 when they are shifted from the first position to the second position and vice versa. A second sidepiece of the L-shaped plate is perpendicular to the front side of the casing 23. The displaceable units 222 are operatively coupled to one or more remote power transmission units 221 using the second sidepiece.

Figure 5:
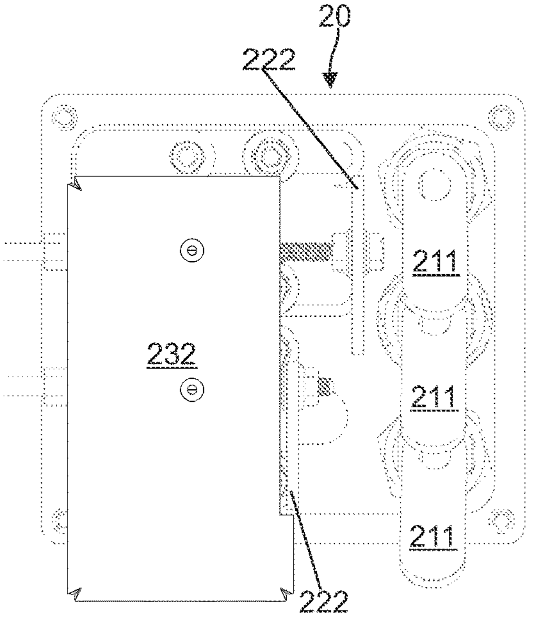
FIG. 5 is a rear view of the device of FIG. 1 showing the locks in their unlocked state.
Figure 6:
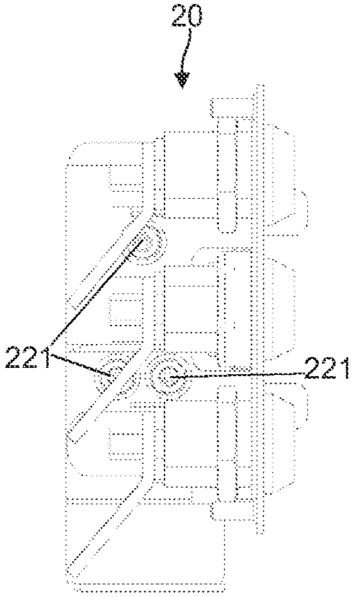
FIG. 6 is a side view of the device of FIG. 1 showing the locks in their unlocked state.

FIG. 5 is a rear view and FIG. 6 is a side view of the device of FIG. 1. FIG. 5 and FIG. 6 show a cover 232 of the casing 23 protecting the remote locking units 22 against tampering.

As can be seen in FIG. 4 and FIG. 6, the lower remote locking unit 22 comprises two remote power transmission units 221, whereas the upper remote locking unit 22 has only a single remote power transmission unit 221. Each remote power transmission unit 221 transmits a displacement of the displaceable unit 222 to the locking member 223 with the consequence that the hook 2231 of the locking member 223 is also displaced. For this, each remote power transmission unit 221 comprises a Bowden cable or alternatively a mechanical linkage. The displacement of the hook 2231 is used to actuate, for example, a latching mechanism of a door. Preferably, the locking member 223 or rather its hook 2231 releases a latch of the latching mechanism to pop up the door when the displaceable unit 222 is shifted from the first position to the second position, and the locking member 223 locks the latching mechanism when the displaceable unit 222 is in the first position. Accordingly, the locking member 223 is in a locking state when the displaceable unit 222 is in the first position and is in a releasing state when the displaceable unit 222 has shifted into the second position.

The two remote power transmission units 221 of the lower remote locking unit 22 are used to operate the same door. For this purpose, a second locking member 223 operatively coupled to the second remote power transmission unit 221 actuates a second latching mechanism of said door.

Referring to FIG. 4, each of the two remote power transmission units 221 of the lower remote locking unit 22 comprises a Bowden cable, which is operatively coupled to the displaceable unit 222 of the lower remote locking unit 22. For this, a first end of an inner cable 2211 of the Bowden cable 221 is connected to the second sidepiece of the L-shaped plate of the displaceable unit 222, whereas a first end of a hollow outer cable 2212 of the Bowden cable 221 is mounted in a support 231 of the casing 23. A locking member 223 of the lower remote locking unit 22 may be operatively coupled to a second end of the respective Bowden cable in a similar manner to that of the operatively coupling of the first end of the inner and outer cable of the Bowden cable to the displaceable unit 222 and the casing 23, respectively. Preferably, the upper remote locking unit 22 is configured similar to the lower remote locking unit 22, but comprises only a single Bowden cable and a single locking member 223.

Figure 7:
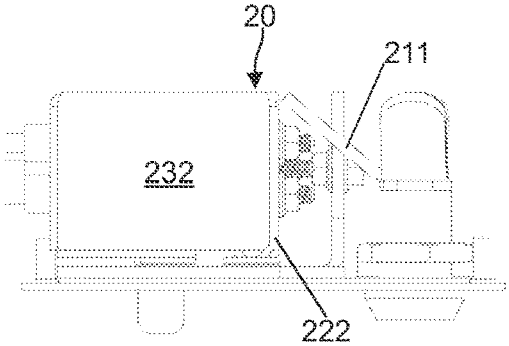
FIG. 7 is a bottom view of the device of FIG. 1 showing the lowermost lock in its locked state.
Figure 8:
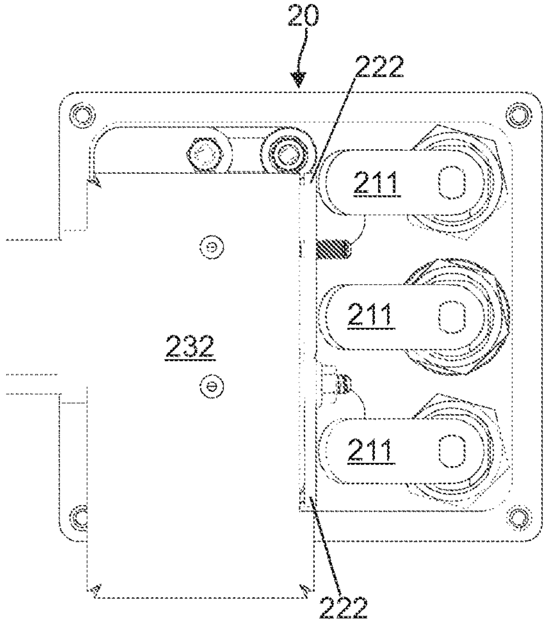
FIG. 8 is a rear view of the device of FIG. 1 showing the locks in their locked state.

FIG. 7 is a bottom view and FIG. 8 is a rear view of the device of FIG. 1. FIG. 7 and FIG. 8 also show the cover 232 of the casing 23 protecting the remote locking units 22 against tampering. However, the state of both the lock 21 shown in FIG. 7 and all three locks 21 depicted in FIG. 8 differs from the state of the locks 21 shown in FIG. 3 to FIG. 6, as will be described below.

Again referring to FIG. 3, each of the three locks 21 comprises a blocking member 211, such as, but not limited to, a cam of a barrel cam lock. The blocking member 211 is attached with one of its two ends to the backside of the lock 21 such that the blocking member 211 can turn together with the lock 21, thereby changing the direction in which the other free end of the blocking member 211 is pointing. In FIG. 3 to FIG. 6, the free end of all blocking members 211 is pointing towards the bottom of the device 20. By operating the locks 21, for example with a key, the blocking members 211 can be turned so that their free end is pointing to the remote locking units 22, as is shown in FIG. 8. In this position, the blocking members 211 of the upper and middle lock 21 prevent the displaceable unit 222 of the upper remote locking unit 22 from leaving the first position and the blocking member 211 of the lower lock 21 prevents the displaceable unit 222 of the lower remote locking unit 22 from leaving the first position. Therefore, the upper remote locking unit 22 is assigned the upper and middle lock 21, whereas the lower remote locking unit 22 is assigned the lower lock 21. Assigning two or more differently keyed locks 21 to a remote locking unit 22, and thus to a single door is ideally used for doors giving access to, for example, components of a gaming machine, which need stronger protection against tampering. The differently keyed locks 21 require that all parties holding the keys must be present to open the door.

As set forth above, each locking member 223 of a remote locking unit 22 is in a locking state when the displaceable unit 222 is in the first position and is in a releasing state when the displaceable unit 222 has shifted into the second position. Accordingly, a lock 21 is in a locked state when its blocking member 211 prevents the respective displaceable unit 222 from leaving the first position, whereas the lock 21 is in an unlocked state when its blocking member 211 allows the displaceable unit 222 to shift into the second position. Therefore, the lower lock 21 shown in FIG. 7 and all locks 21 depicted in FIG. 8 are in the locked state, whereas all other locks 21 shown in FIG. 3 to FIG. 7 are in an unlocked state.

The displaceable unit 222 of a remote locking unit 22 is preferably shifted from the first position to the second position and vice versa by using the slide switch 224. In alternative embodiments, the remote locking unit 22 further comprises a biasing element, such as, but not limited to, a spring forcing the displaceable unit 222 to shift from the first position to the second position if this is allowed by each blocking member 211 of the one or more locks 21 assigned to the remote locking unit 22. In such embodiments, each blocking member 211 of the one or more locks 21 shifts the displaceable unit 222 from the second position to the first position against the force of the biasing element when the state of the respective lock 21 is changed from the unlocked state to the locked state by operating the lock 21 such that the free end of the blocking member 211 is pointing to the displaceable unit 222. When the lock 21 is in the locked state, the blocking member 211 holds the displaceable unit 222 in the first position.

Figure 9:
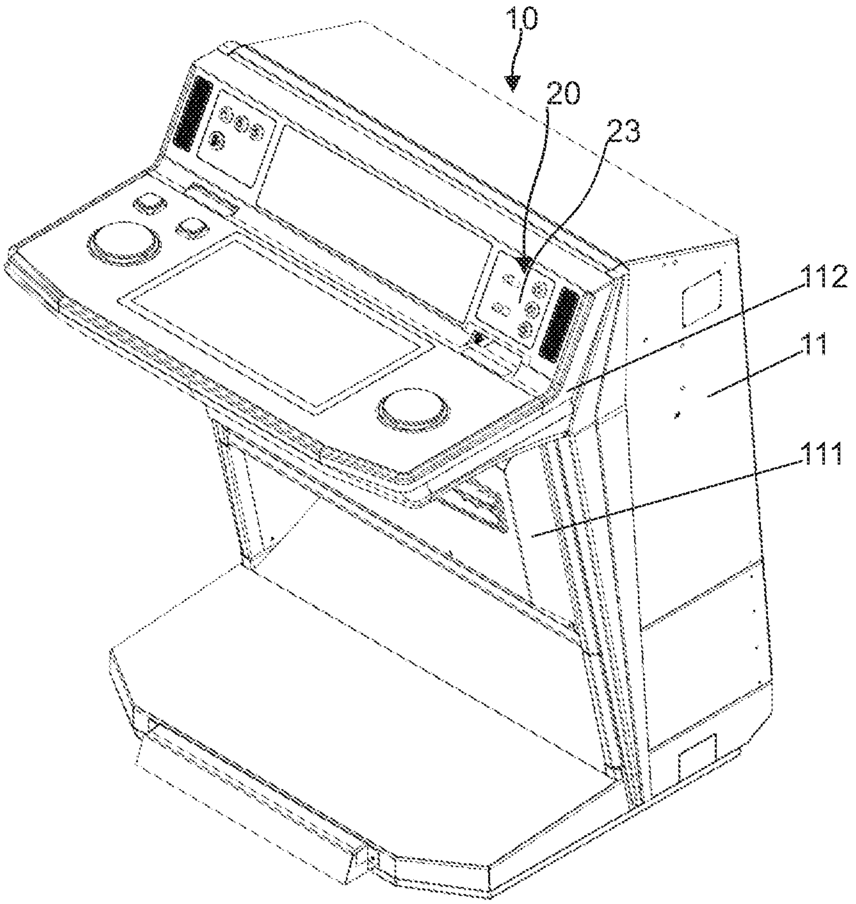
FIG. 9 is a perspective view of a basic unit of a gaming machine comprising the device of FIG. 1.

FIG. 9 is a perspective view of a basic unit of a gaming machine 10 comprising the device 20 of FIG. 1. The device 20 is used for operating a main door 111 and a servicing door 112 of the housing 11 of the gaming machine 10.

It will be understood that, in alternative embodiments, the locks and remote locking units may be integrated directly into a housing of, for example, a gaming machine without the use of an extra casing. According to the present invention, in such embodiments, the locks are adjacently arranged on a section of an outer surface of the housing or on a plate removably integrated in or mounted on the housing and a displaceable unit of each remote locking unit is arranged within reach of a blocking member of each lock assigned to the remote locking unit such that the blocking member prevents the displaceable unit from leaving the first position when the lock is in the locked state and allows the displaceable unit to shift into the second position when the lock is in the unlocked state.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. Further, it will be understood that certain features and combinations may be of utility and may be employed within the scope of the disclosure. Various steps of the described processes set forth herein may be carried out in orders that differ from those described without departing from the scope of the present methods. It is to be understood that while certain forms of the present disclosure have been illustrated and described herein, it is not to be limited to the specific forms or arrangement of parts described and shown.

The invention claimed is:

1. A device for centrally arranging locks, the device comprising:

a plurality of locks arranged on a plate or a front side of a casing; and a plurality of remote locking units;

wherein a remote locking unit of the plurality of remote locking units is assigned one or more locks of the plurality of locks;

wherein the remote locking unit comprises:

a remote power transmission unit having a first end and a second end;

a displaceable unit displaceable between a first position and a second position, the displaceable unit being operatively coupled to the first end of the remote power transmission unit; and a locking member having a locking state and a releasing state, the locking member being operatively coupled to the second end of the remote power transmission unit;

wherein the remote power transmission unit transmits a displacement of the displaceable unit from the first position to the second position such that a state of the locking member changes from the locking state to the releasing state;

wherein a lock of the one or more locks has a locked state and an unlocked state and comprises a blocking member;

wherein the blocking member prevents the displaceable unit from leaving the first position when the lock is in the locked state;

wherein the locking member actuates a latching mechanism of a door of a housing such that a latch of the latching mechanism is released to pop up the door when the state of the locking member is changed from the locking state to the releasing state, and wherein the latching mechanism is locked when the locking member is in the locking state; and wherein the plate or the casing is removably integrated in or mounted on the housing or centrally arranged on a section of an outer surface of the housing.

2. The device of claim 1, wherein the remote power transmission unit transmits a displacement of the displaceable unit from the second position to the first position such that the state of the locking member changes from the releasing state to the locking state.

3. The device of claim 1, wherein the remote locking unit further comprises a second remote power transmission unit and a second locking member operatively coupled to a second end of the second remote power transmission unit and wherein the displaceable unit is operatively coupled to the first end of the remote power transmission unit and to a first end of the second remote power transmission unit.

4. The device of claim 1, wherein each of the one or more locks has a locked state and an unlocked state and comprises a blocking member preventing the displaceable unit from leaving the first position when the respective lock is in the locked state and wherein the displaceable unit is allowed to shift from the first position to the second position when each of the one or more locks is in the unlocked state.

5. The device of claim 4, wherein the remote locking unit further comprises a biasing member forcing the displaceable unit to shift from the first position to the second position.

6. The device of claim 4, wherein each blocking member of the one or more locks shifts the displaceable unit from the second position to the first position when a state of the respective lock is changed from the unlocked state to the locked state.

7. The device of claim 4, wherein the remote locking unit further comprises a slide switch for shifting the displaceable unit from the first position to the second position and vice versa.

8. A gaming machine for playing a game, the gaming machine comprising:
- a housing with a plurality of doors; and
- a device for centrally arranging locks, the device comprising:
  - a plurality of locks for locking and unlocking the plurality of doors; and
  - a plurality of remote locking units;
- wherein the plurality of locks are arranged on a plate or a front side of a casing, the plate or the casing being removably integrated in or mounted on the housing or centrally arranged on a section of an outer surface of the housing;
- wherein a door of the plurality of doors is assigned a remote locking unit of the plurality of remote locking units;
- wherein the remote locking unit is assigned one or more locks of the plurality of locks;
- wherein the remote locking unit comprises:
  - a remote power transmission unit having a first end and a second end;
  - a displaceable unit displaceable between a first position and a second position, the displaceable unit being operatively coupled to the first end of the remote power transmission unit; and
  - a locking member having a locking state and a releasing state, the locking member being operatively coupled to the second end of the remote power transmission unit;
- wherein the remote power transmission unit transmits a displacement of the displaceable unit from the first position to the second position such that a state of the locking member changes from the locking state to the releasing state;
- wherein each of the one or more locks has a locked state and an unlocked state and comprises a blocking member preventing the displaceable unit from leaving the first position when the respective lock is in the locked state;
- wherein the displaceable unit is allowed to shift from the first position to the second position when each of the one or more locks is in the unlocked state; and
- wherein the door comprises a latching mechanism, which is actuated by the locking member.

9. The gaming machine of claim 8, wherein the locking member releases a latch of the latching mechanism to pop up the door when the state of the locking member is changed from the locking state to the releasing state, and wherein the latching mechanism is locked when the locking member is in the locking state.

10. The gaming machine of claim 8, wherein the remote locking unit further comprises a second remote power transmission unit and a second locking member operatively coupled to a second end of the second remote power transmission unit, wherein the displaceable unit is operatively coupled to the first end of the remote power transmission unit and to a first end of the second remote power transmission unit, and wherein the door further comprises a second latching mechanism, which is actuated by the second locking member.

11. A gaming machine for playing a game, the gaming machine comprising:
- a housing with a plurality of doors;
- a plurality of locks for locking and unlocking the plurality of doors, the plurality of locks adjacently arranged on a section of an outer surface of the housing, where the plurality of locks are arranged on a plate or a front side of a casing, the plate or the casing being removably integrated in or mounted on the housing or centrally arranged on the section of the outer surface of the housing; and
- a plurality of remote locking units, each of which being configured to unlock or lock a door of the plurality of doors subject to whether a lock of the plurality of locks is in an unlocked state or a locked state.

12. The gaming machine of claim 11,
- wherein each door of the plurality of doors is exclusively assigned a remote locking unit of the plurality of remote locking units;
- wherein the remote locking unit is assigned one or more locks of the plurality of locks;
- wherein the remote locking unit comprises:
  - a remote power transmission unit having a first end and a second end;
  - a displaceable unit displaceable between a first position and a second position, the displaceable unit being operatively coupled to the first end of the remote power transmission unit; and
  - a locking member having a locking state and a releasing state, the locking member being operatively coupled to the second end of the remote power transmission unit;
- wherein the remote power transmission unit transmits a displacement of the displaceable unit from the first position to the second position such that a state of the locking member changes from the locking state to the releasing state;
- wherein each of the one or more locks has a locked state and an unlocked state and comprises a blocking member preventing the displaceable unit from leaving the first position when the respective lock is in the locked state;

wherein the displaceable unit is allowed to shift from the first position to the second position when each of the one or more locks is in the unlocked state; and wherein each door of the plurality of doors comprises a latching mechanism, which is actuated by the locking member of the remote locking unit exclusively assigned to the respective door.

13. The gaming machine of claim 12, wherein the locking member releases a latch of the latching mechanism to pop up the respective door when the state of the locking member is changed from the locking state to the releasing state and wherein the latching mechanism is locked when the locking member is in the locking state.

14. The gaming machine of claim 12, wherein the remote locking unit further comprises a biasing member forcing the displaceable unit to shift from the first position to the second position.

15. The gaming machine of claim 12, wherein each blocking member of the one or more locks shifts the displaceable unit from the second position to the first position when a state of the respective lock is changed from the unlocked state to the locked state.

16. The gaming machine of claim 12, wherein the remote locking unit comprises a slide switch for shifting the displaceable unit from the first position to the second position and vice versa.

17. The gaming machine of claim 12, wherein the remote power transmission unit transmits a displacement of the displaceable unit from the second position to the first position such that the state of the locking member changes from the releasing state to the locking state.

18. The gaming machine of claim 12, wherein the remote locking unit further comprises a second remote power transmission unit and a second locking member operatively coupled to a second end of the second remote power transmission unit, wherein the displaceable unit is operatively coupled to the first end of the remote power transmission unit and to a first end of the second remote power transmission unit, and wherein the respective door further comprises a second latching mechanism, which is actuated by the second locking member.

* * * * *